United States Patent [19]

Stevens

[11] 4,069,294
[45] Jan. 17, 1978

[54] HYDROMETALLURGICAL RECOVERY OF METAL VALUES

[75] Inventor: Laurence G. Stevens, Des Plaines, Ill.

[73] Assignee: UOP Inc., Des Plaines, Ill.

[21] Appl. No.: 679,106

[22] Filed: Apr. 21, 1976

[51] Int. Cl.$^2$ .................... C01G 3/14; C01G 45/00; C01G 51/12; C01G 53/12

[52] U.S. Cl. ............................. 423/32; 423/49; 423/150; 423/240

[58] Field of Search ........... 423/150, 240, 244, 101 R, 423/32, 49; 75/111, 113, 119

[56] References Cited

U.S. PATENT DOCUMENTS

| | | | |
|---|---|---|---|
| 2,045,092 | 6/1936 | Mitchell | 75/111 |
| 2,074,013 | 3/1937 | Bradley | 423/150 |
| 2,094,277 | 9/1937 | Mitchell | 423/150 |
| 3,492,083 | 1/1970 | Lowicki | 423/244 |
| 3,655,364 | 4/1972 | Evans | 423/150 |
| 3,661,564 | 5/1972 | Gandon et al. | 75/119 |
| 3,845,189 | 10/1974 | Miller et al. | 423/150 |

*Primary Examiner*—O. R. Vertiz
*Assistant Examiner*—Brian E. Hearn
*Attorney, Agent, or Firm*—James R. Hoatson, Jr.; Raymond H. Nelson; William H. Page, II

[57] ABSTRACT

In the hydrometallurgical recovery of metal values from ores and the like in which a metal bearing source is reduced in the presence of at least one additive at temperatures ranging from about 500° to about 900° C. and thereafter extracted, the improvement of said process comprises pretreating a portion of process tails from a preceding run with the additive prior to the reducing roast. The additive which is used to pretreat the minor portion of the feed stock may comprise that which is recovered from the roaster offgas and admixed with a portion of the tail stream from the extraction step.

6 Claims, No Drawings

HYDROMETALLURGICAL RECOVERY OF METAL VALUES

BACKGROUND OF THE INVENTION

In the processing of materials containing metal values, two of the main extractive methods to be considered are pyrometallurgy and hydrometallurgy. In the former, metal-containing material such as ore, slag, scrap, etc., is heated with appropriate agents such as reducing agents, fluxing agents, sulfidizing agents, chloridizing agents and/or oxidizing agents, etc., usually to the melting or fusion point of the mixture. At this temperature there is generally a separation of metallic values from gangue or waste materials. The procedure then calls for separating the metallic values from slag or waste material at a temperature at which both are molten. The phase containing the metal value is then cast to some convenient shape for use or for further refining, whichever is appropriate for the particular system involved. The very high temperatures involved in this technique are achieved via electric furnaces, blast furnaces, reverberatory furnaces, etc. Temperatures required for metals such as copper, nickel, iron would generally range from 2000° F. to 3000° F. An advantage in this method is that recoveries of the metal values are typically quite high.

The hydrometallurgy approach differs substantially from pyrometallurgy in that, although the metal bearing material such as ore, slag, scrap, etc., may be heated with agents such as reducing agents, oxidizing agents, sulfidizing and chloridizing agents as part of the procedure, the temperatures involved are generally much lower than with the usual pyrometallurgical method. These temperatures typically may be 500° F. to 1900° F., temperatures generally well below the fusion point of the metal-containing material.

Following this step, the treated metal-containing material then is contacted with an appropriate aqueous solution for extracting metal values by dissolution. The metal is then removed from the solution by precipitation, solvent extraction, evaporation of solvent, etc. The metal-containing residue obtained is then handled appropriately to further refine the metal. Although conditions of temperature are generally much lower than in pyrometallurgy, it is frequently found that recovery of the metal values is also lower than in the pyrometallurgical method.

A particular case where this is true concerns the extraction of nickel from lateritic nickel ores. The pyrometallurgical processes range from the use of an electric furnace for the direct smelting of ore to produce ferronickel through similar techniques involving the blast furnace in which an iron-nickel-sulfide matte is obtained. The extraction of nickel from the ore using this method is greater than 90%.

Of the several hydrometallurgy approaches used commercially for treating this type of ore, the practice on a limonite ore or a highly serpentinic ore, such as that at Nicaro, Cuba, inovlves roasting the ore in a multihearth furnace while a reducing gas, such as producer gas, passes countercurrent to the ore. Temperatures in this case range from about 900° to about 1350° F. Following the roasting step, the ore is cooled in the absence of air, mixed with an ammoniacal ammonium carbonate solution and vigorously agitated and aerated. This results in the dissolution of nickel and cobalt, separating them from the bulk of the ore. This solution then is treated with steam, driving off ammonia and precipitating nickel carbonate. This product then is treated further to obtain the appropriate form of nickel or use as such. In comparison to the pyrometallurgical process, however, extractions using this method have only been of the order of 70 to 80 percent.

Several other hydrometallurgy methods involve the use of procedures which include a roasting step with chlorides or sulfates but in other than reducing atmospheres, and the roasted ore is leached with an appropriate solvent such as dilute sulfuric acid. Alternatively, in certain cases the ore can be leached directly, such as with sulfuric acid solution but this is practical only when the magnesia content of the ore is low.

The extraction of metal values from metal bearing sources may be improved when the reductive roast is effected in the presence of certain additives such as added hydrogen halide, added sulfur, added sulfur-containing compounds or combinations of these additives. The addition of these additives in which the metal bearing source is pretreated with the additive is known in the trade as a "pugging" step. Normally, when utilizing a hydrogen halide, the pugging step introduces a large amount of water into the process and thus requires that expensive corrosion resistant mixing equipment be present. As will hereinafter be shown, it has now been discovered that only a minor portion of the metal bearing source which is the feed for the process be contacted with the required amount of additive thereby permitting a sizable reduction of the amount of water which is required and concurrently permitting the use of less expensive corrosion resistant equipment.

This invention relates to an improvement in the process for the obtention of metal values from metal bearing sources. More specifically, the invention is concerned with an improvement in the process for the recovery of metal values from metal bearing sources in which the pretreatment of the metal bearing source prior to the reductive roast is effected by contacting only a portion of the feed with at least one additive, said additive being used to improve the recovery of the desired metal value.

As hereinbefore set forth, the hydrometallurgical extraction of metal values has been found to be improved when the reductive roast of the metal bearing source is effected in the presence of additives comprising added hydrogen halide, added solid sulfur, added sulfur-containing compounds or combinations thereof. While the exact reasons for the improved results or the mechanism by which they are accomplished are not known, several explanations therefore may be offered, with the understanding that the applicant does not intend to be limited thereto. One explanation is that the additive may act to reduce or to facilitate reduction of the combined metal or to otherwise assist in liberating the metal, whereby it is readily extractable. Another explanation is that the combination of additives may act or facilitate such action to reduce the nickel in an iron-nickel alloy to thereby convert the nickel into a readily extractable form. Still another explanation is that the combination of additives may act to prevent recombination of the metal into a form in which it is less readily extractable.

It is recognized that different ores respond differently to different additives and that greater improvement in the recovery of metal values may be obtained with some ores when the roasting is conducted in contact with a mixture of added gaseous sulfur compound and added sulfur or in contact with added gaseous sulfur compound and added hydrogen halide or when the roasting is effected in contact with all three of these additives. Also, it is recognized that some added gaseous sulfur compounds will respond differently in this system than other added gaseous sulfur compounds. Accordingly, the specific added gaseous sulfur compound and the added sulfur and/or added hydrogen halide will be selected with reference to the particular ore to be processed.

As hereinbefore set forth, improved recovery of metal values is obtained when the roasting of the metal-containing material such as ore, slag, scrap, etc., is effected in contact with additives such as gaseous sulfur compounds, added solid sulfur, and/or added hydrogen halide, whereby the recovery of the metal value is effected in a considerably higher yield than heretofore obtained in the hydrometallurgical system.

The process of the present invention may be used for the recovery of metal values from ore, slag, scrap or other metal bearing source and is particularly applicable to the recovery of nickel from such sources. However, it is to be understood that the process may be used for the recovery of other metal values including, for example, cobalt, copper, manganese and other metals which are soluble in ammonical ammonium carbonate solutions, but not necessarily with equivalent results. In the interest of brevity, the following discussion will be directed to the recovery of nickel, with the understanding that it may be applied to the recovery of other metals as hereinbefore set forth.

As another advantage to the present invention, the process may be conducted in conventional apparatus and may utilize much of the conventional steps of prior art processes. Accordingly, the ore such as a lateritic nickel ore or other metal bearing source is prepared in a manner suitable for the process, such as finely divided or comminuted particles in a conventional way. The particles may be within a size range of from about 8 mesh to about 500 mesh or smaller and preferably within a range of from about 48 mesh to about 200 mesh. The particles then preferably are dried in a conventional manner to lower the moisture content of from about the usual 25% to 50% down to about 8% or 10% or less. The drying generally is effected in a rotary kiln at conventional temperatures.

The added gaseous sulfur compound will be used in a sufficient concentration for the purpose and may be within the range of from about 0.01% to about 10% and preferably from about 0.1% to about 5% by weight of the ore. Any suitable gaseous sulfur compound may be used in the present invention. Preferred gaseous sulfur compounds comprise hydrogen sulfide, sulfur dioxide, sulfur trioxide, carbonyl sulfide, carbon monosulfide, carbon disulfide, etc. For ease of use, the added gaseous sulfur compound preferably is normally gaseous. However, in another embodiment, it may be normally liquid and vaporized prior to use or allowed to vaporize under the conditions existing in the reducing zone. In another embodiment, the added sulfur compound is a hydrocarbyl sulfide including, for example, methyl mercaptan, ethyl mercaptan, propyl mercaptan, butyl mercaptan, pentyl mercaptan, hexyl mercaptan, etc., but generally containing not more than about 20 carbon atoms per molecule. The solid sulfur which may be used will be in solid forms including powder, flour, granules, pellets, etc., or as molten or as otherwise liquefied sulfur or as sulfur vapors. Generally speaking, the sulfur is employed in a concentration of from about 0.01% to about 5% and preferably from about 0.15% to about 3% by weight of the ore. When the additive comprises a hydrogen halide, the hydrogen halide is used in a concentration of from about 0.01% to about 10% and preferably from about 0.1% to about 5% by weight of the ore. Any hydrogen halide gas may be used and preferably comprises hydrogen chloride or hydrogen bromide. It is also contemplated within the scope of this invention that hydrogen iodide or hydrogen fluoride may also be employed but not necessarily with equivalent results. In still another embodiment, a precursor of hydrogen halide may be used and may be selected from free halogen, chlorine, bromine, iodine, fluorine or other suitable compounds selected from boron halides, carbon halides, phosphorus halides, silicon halides, etc. In still another embodiment, the precursor may comprise a hydrocarbon halide which preferably contains not more than about 20 carbon atoms per molecule.

It is therefore an object of this invention to provide an improvement in the process for effecting the recovery of metal values from a metal bearing source by utilizing only a minor portion of the feed stock to be contacted with the additive prior to admixture with the remaining portion of the feed stock which is thereafter subjected to the reductive roast and extraction steps.

In one aspect an embodiment of this invention resides in a process for the recovery of metal values from a metal bearing source wherein said metal bearing source is subjected to a roast in a reducing atmosphere at a temperature in the range of from about 550° to about 900° C. in contact with at least one additive, cooling the metal bearing source, extracting the cooled metal bearing source to provide a source containing dissolved metal values and an undissolved tail stream, and recovering the desired metal values, the improvement which comprises pretreating a minor portion of said metal bearing source with a slurry comprising an additive treated tail stream which contains at least one additive and thereafter admixing said treated minor portion of said metal bearing source with the remainder of said metal bearing source prior to the reduction thereof.

A specific embodiment of this invention is found in a process for the recovery of metal values from a metal bearing source wherein said metal bearing source such as nickel ore is subjected to a roast in a reducing atmosphere at a temperature in the range of from about 550° to about 900° C. in contact with hydrochloric acid, cooling the metal bearing source, extracting the cooled metal bearing source to provide a solution containing dissolved nickel metal values and an undissolved tail stream, and recovering the desired metal values, the improvement in said process comprising regenerating hydrogen chloride from the roaster step and contacting said hydrogen chloride with a slurry of the tail streams in a scrubber means whereby said hydrogen chloride is admixed with the tail stream and the resulting mixture is utilized to pretreat a minor portion of the nickel metal bearing source prior to the reduction thereof.

Other objects and embodiments will be found in the following further detailed description of the present invention.

As hereinbefore set forth the present invention is concerned with an improvement in the hydrometallurgical recovery of metal values from metal bearing sources, said improvement residing in the treatment of only a minor portion of the feed stock with an additive of the type hereinbefore set forth in greater detail prior to the reduction roast. The reduction of the metal bearing source which contains the additive is effected in the presence of a reducing gas at a temperature in the range of from about 500° to about 900° C. or more and preferably at a temperature in the range of from about 650° to about 850° C. Conventional reducing zones which may be utilized will include, for example, multiple hearth furnaces, fluosolids roasters, etc. The chemical reduction of the metal bearing source such as the ore is effected by means of a suitable reducing gas mixture which is of the general type used in conventional processes. Any suitable reducing gas mixture may be used and preferably comprises a mixture of hydrogen, carbon monoxide, carbon dioxide and water vapor. The gas mixture which is used may come from any suitable source, including producer gas, gases formed by the combustion of city gas, gases formed by the combustion of oils, etc. The specific gas mixture will be selected to effect the desired reduction of the nickel compounds. An illustrative gas mixture comprises a $CO:CO_2$ ratio within the range of about 0.1:1 to 10:1, a $CO:H_2$ ratio within the range of about 0.1:1 to 10:1 and $H_2:H_2O$ vapor ratio within the range of about 0.1:1 to 10:1, all being on a volumetric basis. In one embodiment, it is desirable to maintain the gas mixture within the ratios set forth above because an excessive concentration of one or more of the components in the gas mixture may have undesired effects such as, for example, incomplete reduction of the metal compound, excessive adsorption of the gas in the ore particles, etc. It is understood that the gas mixture may contain other components as, for example, nitrogen, when advantages appear therefor. Another illustrative gas mixture comprises hydrogen, nitrogen and water vapor. Still another gas mixture may comprise natural gas. In another method, solid reducing agents, such as coke, etc., may be used.

The reducing step is effected in relatively short times, high recoveries of metal values being obtained when utilizing roasting times of about 0.5 hours. This is in contrast to the requirements of greater than 1 hour when the reducing treatment is effected in the absence of the additives hereinbefore set forth. However, it is also contemplated within the scope of this invention that longer roast times may be used if so desired. Some advantages which are present when utilizing the process of this invention include the fact that the pretreatment, crushing, grinding, drying and reducing steps may be conducted in conventional apparatus. Also, as another advantage, the hydrometallurgical process is effected at lower temperatures than the pyrometallurgical process of the prior art and therefore, avoids the objections which are inherent in the higher temperature reduction processes.

The reduced ore particles are withdrawn from the reducing zone and then processed in conventional manner for the hydrometallurgical extraction of the nickel. The effluent from the reduction zone is first cooled several hundred degrees and then is passed into one or more quench zones. In a preferred embodiment, the quench liquid is the ammonium carbonate leaching solution. However, the quenching must be effected in the absence of air. In other words, oxygen or air should not contact the reduced particles until the temperature of the particles is below about 95° C. because of the possibility of oxidation of the metal to the oxide or to other oxygen-containing compounds. It is understood that other suitable quenching solutions may be employed but, as hereinbefore set forth, economical advantages appear for the use of the leaching solution for this purpose.

Any suitable ammoniacal leaching solution may be employed and preferably comprises aqueous ammonium carbonate solution containing from about 2% to about 25% and preferably about 3% to about 15% $NH_3$ and from about 1% to about 15% and preferably from about 1.5% to about 7.5% $CO_2$. As still another advantage to the process of the present invention, the leaching solution comprises a lower concentration of $NH_3$ than generally is utilized in the prior art, thus effecting an additional economy in the present process. The leaching is effected at a temperature below 95° C. and conveniently ambient temperature. Ambient pressure or superatmospheric pressure may be used but generally will not exceed about 100 psig. As hereinbefore set forth, the leaching is effected in the presence of oxygen, which may comprise ambient air when the leaching is effected in open tanks or vessels or it may comprise air introduced into closed zones. It is understood that, in place of air, oxygen or other suitable oxygen-containing source may be utilized.

The reduction effected in accordance with the present invention facilitates extraction of the nickel, and particularly separation thereof from iron or iron compounds. Also, it appears to help in the separation of nickel from cobalt in the leaching solution. The extraction is effected in any suitable manner, and generally by passing the ore countercurrently to the leaching solution in a plurality of leaching and thickening zones. Here again, conventional apparatus may be used.

The solution of nickel withdrawn from the leaching and thickening zone is then treated in any suitable manner to precipitate the nickel and to recover the same. In one method, this is accomplished by steaming to precipitate the nickel carbonate and to volatilize off ammonia, $CO_2$ and water. The process of the present invention permits recoveries of nickel greater than 80%, in contrast to the recoveries of less than 50-70% normally obtained in the prior art methods. Furthermore, as hereinbefore set forth, low iron content ores may be treated economically to recover nickel therefrom, in contrast to the former requirement of using the high temperature pyrometallurgical process or in not being able to effect such recovery economically.

The undissolved solids which are separated in the ammoniacal leach step are water washed and steam stripped to recover ammoniacal compounds which may be reused in the system. Following this at least a portion of the leached tails are then passed to a scrubber recycle means to form a slurry. The aftertreatment of the portion of the tail stream with the additive or combination of additives is effected in any suitable manner which may include the methods hereinbefore set forth for pretreatment and may utilize the same or similar dilute hydrogen halide acid solution or sulfur-containing system and quantites thereof. The portion of the leached tails can then be used in an additive recycle means to form the scrubbing medium in which the hydrogen halide and/or sulfur or sulfur-containing compound which are formed in the roaster offgas may be recovered. As hereinbefore set forth, the roaster offgas containing the additives which have been used to pretreat the metal bearing source, water vapor, carbon monoxide, carbon dioxide, etc., are passed through this slurry in a first recycle scrubbing means. The resulting hydrogen halide-containing slurry of tail stream is then used to contact a minor portion of the metal bearing source by any means known in the art and thereafter the resulting mixture is admixed with the major portion of the metal bearing source which is then passed into the reduction roasting zone. By utilizing at least a portion of the leached tails stream as a scrubbing medium, it is possible to effect a greater recovery of nickel values or other metals and, in addition, will permit the use of a relatively small amount of additive which is in contrast to prior art methods in which the additive or combination of additives has been added directly to the reducing roaster zone. The recycle of the tail streams, or a portion thereof, may also be beneficial to the process in that the chemical composition of the ore which is to be roasted is adjusted to a preferred content of other metals such as additional magnesium silicates, iron compounds, etc., thus permitting an optimization of nickel extraction. In addition, another beneficial effect of the recycle of tail streams is that the nickel which is present in the tail streams in a relatively minor amount may be recovered therefrom by the aforesaid recycle.

It is also contemplated within the scope of this invention that a second portion of tail streams may be employed as a scrubbing means for recovery of sulfur or sulfur-containing compounds in a second scrubber means, preferably in the presence of an added alkaline compound in order to insure that the pH is in the alkaline range rather than the acid range. Examples of alkaline compounds which may be utilized will include sodium hydroxide, potassium hydroxide, lithium, calcium hydroxide, magnesium hydroxide, the corresponding carbonates, etc. The amount of alkaline compound which is used will vary over a wide range and will be sufficient, as hereinbefore set forth, to maintain an alkaline range in the scrubber means. Thereafter the tail streams containing the sulfur or sulfur-containing compound will be admixed with a second minor portion of the metal bearing source and the two parts of the minor portion are then combined with the major portion of the metal bearing source prior to roasting or calcination.

In another embodiment of the invention the leached tails stream in slurry form which is used as the scrubbing medium to recover the hydrogen halide and/or sulfur or sulfur-containing compound in the roaster offgas may also be subjected to separation means whereby the solids are separated from the liquid phase and the latter which contains the dilute hydrogen halide may be utilized itself as the pretreatment medium rather than the combined slurry.

It is also contemplated within the scope of this invention that the leached tails stream may be subjected to a magnetic or electrostatic separation step by utilizing conventional magnetic or electrostatic separation means whereby a fraction which is rich in desired metal values is produced and thereafter utilized in a manner hereinbefore set forth as a scrubbing medium for the obtention of the hydrogen halide in the roaster offgas. By utilizing such a fraction which is rich in desired metal values, it is possible to recover a greater amount of the desired metal values such as nickels than has heretofore been recovered when utilizing the methods set forth in the prior art.

The following examples are used as illustrations of the process of the present invention. However, it is to be understood that these examples are given merely for the purposes of illustration and are not intended to limit the generally broad scope of the present invention in strict accordance therewith.

EXAMPLE I

In this example tailings which had been obtained by leaching nickel from a lateritic ore which previously had been roasted in a reductive atmosphere and leached with ammonia were used as a 10% solids slurry to scrub offgases from the reductive roast, said offgases containing hydrogen chloride. The scrubbing was accomplished in a scrubber zone by passing said offgases through the slurry with agitation. Substantially all of the hydrogen chloride was recovered from the offgases as evidenced by the fact that only slight traces of arsenic chloride precipitated out of a second scrubber which contained only water. A lateritic nickel ore which had the following assay

|  | Percent |
|---|---|
| Nickel | 1.73 |
| Cobalt | 0.072 |
| Iron | 25.7 |
| Magnesium | 2.4 |
| Chromium | 1.09 |
| Silica | 42.4 | was finely ground to less than 65 mesh. A slurry containing 10% solids which was used to scrub the offgases and which contained hydrogen chloride was mixed with 90 grams of the finely ground ore. One percent sulfur in the form of ferrous disulfide was added and the mixture was reductively roasted in the presence of a producer gas type mixture containing carbon monoxide, hydrogen, nitrogen, carbon dioxide and water at a temperature ranging from about 500° to about 750° C. for a period of 30 minutes. After being treated in this manner the reduced ore was recovered and allowed to return to room temperature. The reduced ore was then transferred in a nitrogen atmosphere and leached by being slurried with an ammoniacal ammonium carbonate solution, said slurry being agitated vigorously at ambient temperature for a period of about 2½ hours after which is was filtered. The filtrate was then assayed for nickel content to determine the percent extraction of nickel, said extraction being 89.6%.

In contrast to this when a lateritic nickel ore was subjected to reductive roasts followed by ammoniacal leaching without the addition of any additives in a pretreatment stage only 32.1% of the nickel was extracted from the ore.

EXAMPLE II

In this example the tailings which are obtained from the leaching step of a nickel recovery process may be subjected to a magnetic separation step whereby a fraction which is rich in desired metal values is recovered. A portion of this fraction is then recycled and admixed with water to form a slurry. The slurry is then passed to a scrubbing zone wherein a slurry is contacted with the offgases from the reductive roast of the ore. After passing the offgases through the slurry the slurry which contains about 10% solid tailings and which has extracted the hydrogen chloride from the offgases may be recovered and admixed with a minor portion, that is, about 10%, of finely ground lateritic nickel ore which comprises a metal bearing source. The slurry-ore mixture may then be contacted with an additional amount of sulfur and thereafter the mixture admixed with the remaining portion, that is, 90% of the lateritic ore, the total metal bearing source containin the slurry and the additives may then be passed to a roasting zone wherein the ore is contacted with producer type gases and reductively roasted at a temperature of about 700° C. for a period of about 1 hour. At the end of this time the ore may then be recovered and subjected to a leaching operation wherein said ore may be contacted with an ammoniacal ammonium carbonate solution. The resulting slurry may then be vigorously agitated for a period of about 2 hours at ambient temperature and after the agitation has been discontinued the slurry may then be subjected to filtration. The extractednickel may then be recovered by any means known in the art.

I claim as my invention:

1. A process for the recovery of metal values from a metal bearing source containing a metal selected from the group consisting of nickel, cobalt, copper and manganese, which comprises the steps of:
   1. pretreating a minor portion of said metal bearing source with a hydrogen halide treated tail stream formed as hereinafter set forth and then commingling the pretreated minor portion with the remainder of the metal bearing source;
   2. roasting the resultant mixture in a reducing atmosphere at a temperature of from about 550° to about 900° C.;
   3. cooling the roasted material and then extracting the same with an ammonium carbonate leaching solution;
   4. scrubbing the hydrogen halide-containing offgas from roasting step (2) with a slurry of at least a portion of the leached tails from step (3) to transfer hydrogen halide from the offgas to the slurry; and
   5. supplying resultant hydrogen halide-containing slurry from step (4) to step (1) as said hydrogen halide treated tail stream.

2. The process of claim 1 in which said metal value is nickel.

3. The process of claim 1 in which said hydrogen halide is hydrochloric acid.

4. The process of claim 1 in which said minor portion of said metal bearing source is in a range of from about 1% to about 49% of the total feed.

5. The process of claim 1 in which said slurry is formed from only a portion of the total tail stream.

6. The process of claim 1 in which said metal bearing source is a lateritic nickel ore.

* * * * *